United States Patent [19]
Weinreich

[11] 3,861,010
[45] Jan. 21, 1975

[54] BORING HEAD WITH EXCHANGEABLE BLADE

[75] Inventor: Siegfried Weinreich, Bierden, Germany

[73] Assignee: Gebrigder Heller, Uphusen, Germany

[22] Filed: Apr. 24, 1974

[21] Appl. No.: 463,805

[30] Foreign Application Priority Data
Apr. 25, 1973 Germany............................ 2320876

[52] U.S. Cl.................... 29/96, 29/105 R, 29/90, 408/153, 408/199, 408/239
[51] Int. Cl............................................... B26d 1/00
[58] Field of Search ...... 29/96, 105 R, 90; 408/153, 408/199, 239

[56] References Cited
UNITED STATES PATENTS

| | | |
|---|---|---|
| 3,250,154 | 5/1966 | Breuning............................ 29/96 X |
| 3,400,616 | 9/1968 | Mihic.............................. 408/199 X |
| 3,410,160 | 11/1968 | Le Barre............................ 408/153 |
| 3,782,849 | 1/1974 | Mizoguchi.......................... 408/239 |

Primary Examiner—Leonidas Vlachos
Attorney, Agent, or Firm—Wigman & Cohen

[57] ABSTRACT

This disclosure relates to a boring head having two support ledges and a cutter that may be rotated when the cutting edges become worn so as to provide new cutting edges. The cutter is developed as an irregular hexagon the sides of which form a section of the sides of two equilateral triangles which are superposed on each other around an acute angle. The boring head includes a recess for the cutter having contact surfaces against which at least one of rake surfaces behind the cutting edges will bear so as to fix the cutter in a predetermined operating position in which one of the cutting edges cooperates the the two support ledges to provide centering of the boring head in a bored hole.

3 Claims, 3 Drawing Figures

BORING HEAD WITH EXCHANGEABLE BLADE

SUMMARY OF THE INVENTION

It is, therefore, a primary object of this invention to provide a boring head of the type described which will facilitate cutting edge replacement while, at the same time, provide means for maintaining a boring of constant diameter.

More particularly, it is an object of this invention to provide a boring head having a cutter with a plurality of cutting edges, and wherein the cutter can be rotated to replace the edge when the previous edge becomes worn, the boring head also having recess means engageable with at least one of the non-worn rake surfaces behind the edges to fix the cutter in a predetermined operating position.

Accordingly, the foregoing and other objects are accomplished by providing a boring head having the following characteristics:

a. Two support ledges are provided on the cylindrical body of the boring head which run parallel to the axis of the boring head and protrude from the peripheral surface of the body of the boring head in such a way that they form two supporting surfaces for the centering of the boring head in the bored out drilling.

b. A turnplate is provided as the cutter which is developed as an irregular hexagon the sides of which form a section of the sides of two equilateral triangles which are superposed on each other around an acute angle so that the sections of the sides of one triangle are developed as principal edges, and the sections of the sides of the other triangle are developed as secondary edges.

c. The rake surfaces behind the secondary edges are developed as circular grinding chamfers.

d. A recess is provided for the turnplate which forms contact surfaces for the rake surfaces behind two of the principal edges. These contact surfaces are arranged in such a way that the secondary edge, which in relation to the axis of the boring head is radially the most exterior blade, runs parallel to the axis of the boring head at such a radial distance from the axis of the boring head that, as a third support, it interacts with the supporting ledges and that the rake surfaces behind the two other secondary edges are exposed.

As a result of the characteristics (a), (c) and (d), the supporting ledges together with the rake surface of the secondary edge which is radially exterior and parallel to the axis of the boring head, form three support surfaces through which the boring head can be correctly centered and directed even in the case of deep drillings. Because of the fact that, in addition, according to characteristic (b), a turnplate with the indicated features is provided as the cutter, and according to (d), the contact surfaces of the recess for the turnplate are only intended for the rake surfaces behind the principal blades, while the rake surfaces behind the secondary edges are exposed, it is achieved that each position of the turnplate is exactly defined. This result is achieved because the rake surfaces behind the principal edges which are not being subjected to wear insure that the rake surface behind the secondary blade which is parallel to the axis of the boring head, together with the support ledges, precisely direct the boring head, even after the exchange of the blades, thereby maintaining constant the diameter of the boring.

The cutter may be mounted directly in a recess of the boring head; it may, for example, be fastened by means of a screw. However, in an advantageous construction, the recess for the cutter is located in a cutter holder which is detachably mounted in a recess of the boring head. This makes it possible to connect the cutter holder in various positions with the boring head so that drillings of different diameters can be bored out with the same cutter.

With the above and other objects in view that may hereinafter become evident, the nature of the invention will be more clearly understood by reference to the accompanying drawing, the following detailed description thereof, and the appended claimed subject matter.

DETAILED DESCRIPTION OF PREFERRED EMBODIMENT

Figure 1:
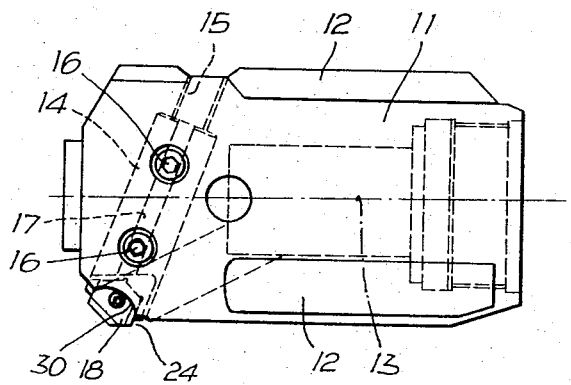
FIG. 1 is an elevation view of a boring head constructed in accordance with this invention; and illustrates a cutter holder inclined at an angle to the axis of the boring head, the cutter holder carrying a turnplate as the cutter which is developed as an irregular hexagon.
Figure 2:
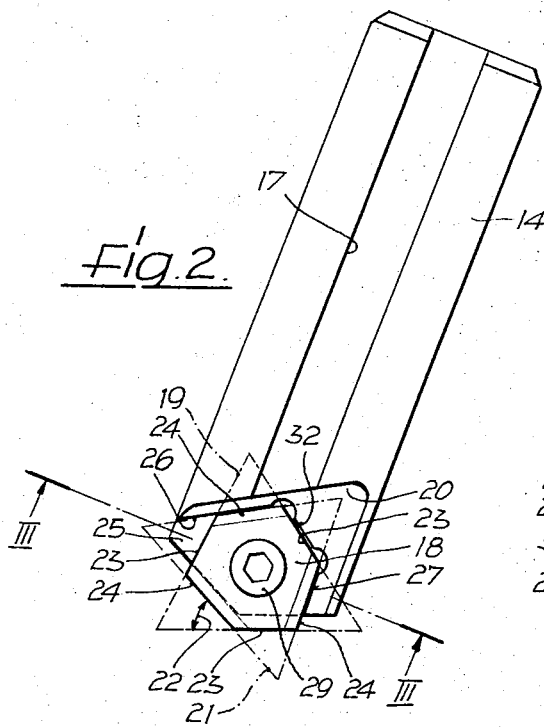
FIG. 2 is an enlarged elevation view of the cutter holder and turnplate cutter illustrated in FIG. 1.

The boring head 11 shown in the drawing, has two support ledges 12, which protrude from a cylindrical peripheral surface and run parallel to the axis 13 of the boring head. At the front end of the boring head 11, a bore which forms an angle with the axis 13 is provided for a cylindrical cutter holder 14. A taphole 15 for a worm screw is connected to this bore which can support the interior end of the cutter holder 14. For the clamping of the cutter holder 14 in the position determined by the worm screw, which is not shown, countersunk screws 16 in the tapholes of the boring head 11 are provided which engage into a longitudinal groove 17 in the cutter holder 14 in order to prevent rotation of the same around its longitudinal axis.

At the distal end of the cutter holder 14, a cutter 18 is mounted which is developed as a turnplate. This cutter 18 forms an irregular hexagon, the sides of which form a section of the sides of two equilateral triangles 19 and 21 which, relatively disposed about an acute angle 22, are superposed on each other. The sections of the sides of triangle 19 form secondary cutting edges 23 of the cutter 18, and the sections of the sides of triangle 21 form principal cutting edges 24. To receive the cutter 18, a recess 20 is provided in the cutter holder 14. The walls of this recess 20 supply a contact surface 25 for the broadside of the cutter 18, as well as two contact surfaces 26 and 27 for the rake surfaces 28 behind the principal edges 24. These contact surfaces 26 and 27 are arranged in such a way that when the cutter holder 14 is inserted into the boring head and a cutter 18 is mounted on it, a secondary edge 23 runs parallel to the axis 13 at a distance from it which corresponds to the distance of the most exterior outer surfaces of the supporting ledges 12 from the axis 13. The cutter 18 is mounted on the cutter holder 14 by means of a screw 29 which extends through a central bore of the cutter 18 and which is accessible through a recess 30 in the boring head 11 as seen in FIG. 1.

Figure 3:
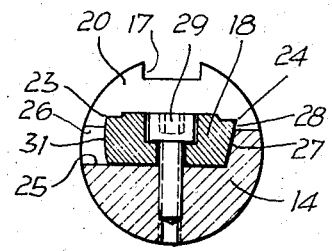
FIG. 3 is a sectional view taken along line III—III of FIG. 2, and illustrates one plane rake surface and one rounded rake surface behind the principal and secondary edges of the cutter, respectively.

As shown in FIG. 3, the rake surfaces behind the secondary blades 23 are developed as rounded grinding chamfers 31, while the rake surfaces 28 behind the principal edges 24 are planar. The surface 32, which is located between the contact surfaces 26 and 27, is somewhat recessed opposite the cutter 18 so that the blades with the circular grinding chamfers 31 do not contact the surface 32.

As shown in FIG. 1, the cutter 18 can at all times be removed from the recess 20, without having to remove the cutter holder 14, by simply loosening the screws 29, and can then be rotated about its center bore in such a way that new secondary and principal blades 23 and 24 reach their operating position. In this position the planar surfaces 28 of the principal blades 24 lie against the contact surfaces 26 and 27 whereby the position of the cutter 18, regardless of whether one or two of the principal blades 24 are worn down, is always fixed in exactly the same way. This is because the remaining surface(s) 28, which is (are) not worn down, will lie against one of the contact surfaces 26, 27, thereby securing its position.

Although only a preferred embodiment of the invention has been specifically illustrated and described herein, it is to be understood that minor modifications could be made therein without departing from the spirit of the invention.

It is claimed:

1. A boring head comprising a cylindrical body having a longitudinal axis extending therethrough, at least two support ledges protruding radially from said body and extending parallel to the axis thereof for providing support surfaces for centering the boring head in a bored hole, a cutter developed as an irregular hexagon the sides of which form a section of the sides of two equilateral triangles superposed on each other about an acute angle, said sections of the sides of one of said triangles providing three principal edges and said sections of the sides of the other of said triangles providing three secondary edges, said principal edges border three rake surfaces and said secondary edges border three rounded, ground chamfers, said cutter being mounted in recess means having two contact surfaces for abutting two of said three rake surfaces thereby fixing the position of said cutter in the boring head, and wherein one of said secondary edges extends parallel to said longitudinal axis of said body at a radial distance therefrom corresponding to the radial protrusion of said support ledges whereby said one secondary edge cooperates with said support ledges to provide centering of said boring head in a bored hole.

2. A boring head as defined in claim 1, wherein said recess means is provided in a cutter holder which is detachably mounted in a bore of said boring head.

3. A boring head as defined in claim 2, wherein said bore extends at an angle to said longitudinal axis.

* * * * *